United States Patent
Narula et al.

(10) Patent No.: US 10,866,707 B2
(45) Date of Patent: Dec. 15, 2020

(54) CACHING DATA FOR RENDERING DATA PRESENTATION

(71) Applicant: SAP SE, Walldorf (DE)

(72) Inventors: Sanam Narula, Vancouver (CA); Nathan Wang, Coquitlam (CA); Pak Man Chan, Vancouver (CA); Rita Huang, Vancouver (CA)

(73) Assignee: SAP SE, Walldorf (DE)

(*) Notice: Subject to any disclaimer, the term of this patent is extended or adjusted under 35 U.S.C. 154(b) by 61 days.

(21) Appl. No.: 16/211,132

(22) Filed: Dec. 5, 2018

(65) Prior Publication Data

US 2020/0183551 A1 Jun. 11, 2020

(51) Int. Cl.
*G06F 3/048* (2013.01)
*G06F 3/0484* (2013.01)

(52) U.S. Cl.
CPC .................... *G06F 3/0484* (2013.01)

(58) Field of Classification Search
CPC ....... G06F 3/048; G06F 3/0482; G06F 3/0484
See application file for complete search history.

(56) References Cited

U.S. PATENT DOCUMENTS

| | | | |
|---|---|---|---|
| 2007/0118813 A1* | 5/2007 | Forstall | G06F 3/0486 715/805 |
| 2010/0058248 A1* | 3/2010 | Park | G06F 3/0481 715/851 |
| 2011/0283209 A1* | 11/2011 | Levin | G06F 9/451 715/765 |
| 2011/0289065 A1* | 11/2011 | Wells | G06F 16/9577 707/706 |
| 2012/0023407 A1* | 1/2012 | Taylor | G06F 9/451 715/731 |
| 2013/0318424 A1* | 11/2013 | Boyd | G06T 11/60 715/202 |
| 2017/0123397 A1* | 5/2017 | Billi | G06Q 10/0639 |
| 2017/0147308 A1* | 5/2017 | Wang | G06F 8/54 |
| 2018/0218520 A1* | 8/2018 | Watson | G06T 11/206 |
| 2018/0341369 A1* | 11/2018 | Johnston | G06F 16/958 |
| 2018/0349516 A1* | 12/2018 | Dutta | G06F 16/904 |
| 2019/0042631 A1* | 2/2019 | Bolognese | G06F 16/2455 |
| 2019/0349273 A1* | 11/2019 | Rikovic Tabak | H04L 43/045 |

* cited by examiner

*Primary Examiner* — Xiomara L Bautista
(74) *Attorney, Agent, or Firm* — Mintz Levin Cohn Ferris Glovsky and Popeo, P.C.

(57) ABSTRACT

A method for accessing data stored in a database may include receiving, at an application, a request to load a data story including a first software widget and a second software widget. The first software widget and the second software widget each being configured to create, based on a portion of data stored in a database coupled with a cloud-based analytics engine, a corresponding data presentation providing a visual representation of at least the portion of data. The first software widget may be rendered while visualization data for the second software widget is retrieved from the cloud-based analytics engine, processed, and stored in a cache. Upon completing the rendering of the first software widget, the processed visualization data for the second software widget may be retrieved from the cache in order to render the second software widget. Related systems and articles of manufacture are also provided.

20 Claims, 5 Drawing Sheets

CACHING DATA FOR RENDERING DATA PRESENTATION

TECHNICAL FIELD

The subject matter described herein relates generally to database processing and more specifically to caching data retrieved from a cloud-based analytics engine for rendering a data presentation.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for generating a data presentation that provides a visual representation of data stored in a database. In one aspect, there is provided a system. The system may include at least one data processor and at least one memory. The at least one memory may store instructions that result in operations when executed by the at least one data processor. The operations may include: receiving, at an application, a request to load a data story, the data story including a first software widget and a second software widget, the first software widget and the second software widget each being configured to create, based at least on a portion of data stored in a database coupled with a cloud-based analytics engine, a corresponding data presentation providing a visual representation of at least the portion of data; while the first software widget is being rendered, retrieving, from the cloud-based analytics engine, a visualization data for the second software widget, processing the visualization data for the second software widget, and storing, in a cache, the processed visualization data for the second software widget; and upon completing the rendering of the first software widget, rendering, based at least on the processed visualization data for the second software widget stored in the cache, the second software widget.

In some variations, one or more features disclosed herein including the following features may optionally be included in any feasible combination. The first software widget and/or the second software widget may be rendered in a viewport of a graphic user interface displayed at a client.

In some variations, the visualization data retrieved from the cloud-based analytics engine may include raw visualization data. The raw visualization data may be stored in another cache prior to the processing.

In some variations, a query configured to retrieve, from the cloud-based analytics engine, the visualization data for the second software widget may be sent to the cloud-based analytics engine. The rendering of the second software widget may include retrieving the processed visualization data for the second software widget from the cache without sending, to the cloud-based analytics engine, another query to retrieve the visualization data for the second software widget.

In some variations, the rendering of the first software widget and/or the second software widget may be performed by a web browser associated with the application. The web browser may be implemented in a native programming language of a mobile device hosting the application. The retrieval of the visualization data may be performed by a scripting engine executing programming code. The scripting engine may be associated with a programing language that is non-native to the mobile device hosting the application. The programming code may include a script that is executed by the scripting engine without compilation. The cloud-based analytics engine may be configured to provide, to the mobile device, access to the data stored in the database by at least providing, to the mobile device, the visualization data for rendering the data presentation.

In some variations, the rendering of the first software widget and the second software widget may be performed sequentially. The retrieval of the visualization data for the second software widget may be performed at least partially in parallel with the rendering of the first software widget.

In some variations, the first software widget and/or the second software widget may be transient applications and/or auxiliary applications.

In another aspect, there is provided a method for generating a data presentation that provides a visual representation of data stored in a database. The method may include: receiving, at an application, a request to load a data story, the data story including a first software widget and a second software widget, the first software widget and the second software widget each being configured to create, based at least on a portion of data stored in a database coupled with a cloud-based analytics engine, a corresponding data presentation providing a visual representation of at least the portion of data; while the first software widget is being rendered, retrieving, from the cloud-based analytics engine, a visualization data for the second software widget, processing the visualization data for the second software widget, and storing, in a cache, the processed visualization data for the second software widget; and upon completing the rendering of the first software widget, rendering, based at least on the processed visualization data for the second software widget stored in the cache, the second software widget.

In some variations, one or more features disclosed herein including the following features may optionally be included in any feasible combination. The first software widget and/or the second software widget may be rendered in a viewport of a graphic user interface displayed at a client.

In some variations, the visualization data retrieved from the cloud-based analytics engine may include raw visualization data. The raw visualization data may be stored in another cache prior to the processing.

In some variations, the method may further include sending, to the cloud-based analytics engine, a query configured to retrieve, from the cloud-based analytics engine, the visualization data for the second software widget. The rendering of the second software widget may include retrieving the processed visualization data for the second software widget from the cache without sending, to the cloud-based analytics engine, another query to retrieve the visualization data for the second software widget.

In some variations, the rendering of the first software widget and/or the second software widget may be performed by a web browser associated with the application. The web browser may be implemented in a native programming language of a mobile device hosting the application. The retrieval of the visualization data may be performed by a scripting engine executing programming code. The scripting engine may be associated with a programing language that is non-native to the mobile device hosting the application. The programming code may include a script that is executed by the scripting engine without compilation. The cloud-based analytics engine may be configured to provide, to the mobile device, access to the data stored in the database by at least providing, to the mobile device, the visualization data for rendering the data presentation.

In some variations, the rendering of the first software widget and the second software widget may be performed sequentially. The retrieval of the visualization data for the second software widget may be performed at least partially in parallel with the rendering of the first software widget.

In another aspect, there is provided a computer program product that includes a non-transitory computer readable storage medium. The non-transitory computer-readable storage medium may include program code that causes operations when executed by at least one data processor. The operations may include: receiving, at an application, a request to load a data story, the data story including a first software widget and a second software widget, the first software widget and the second software widget each being configured to create, based at least on a portion of data stored in a database coupled with a cloud-based analytics engine, a corresponding data presentation providing a visual representation of at least the portion of data; while the first software widget is being rendered, retrieving, from the cloud-based analytics engine, a visualization data for the second software widget, processing the visualization data for the second software widget, and storing, in a cache, the processed visualization data for the second software widget; and upon completing the rendering of the first software widget, rendering, based at least on the processed visualization data for the second software widget stored in the cache, the second software widget.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a graphic user interface for accessing hierarchical data stored in a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A cloud-based analytics engine may be configured to provide a variety of functionalities for accessing data stored in a database. For example, a user at a client may load, via an application at the client, a data story associated with at least a portion of the data stored in the database. The data story may include one or more software widgets that enable the user at the client to create data presentations providing a visual representation of at least the portion of the data stored in the database. For instance, the user may interact with a software widget displayed as part of a graphic user interface (GUI) at the client in order to create, based at least on the portion of the data stored in the database, a corresponding data presentation. As such, in response to the user at the client loading the data story, the application be configured to may retrieve, from the cloud-based analytics engine, visualization data by at least sending, to the cloud-based analytics engine, one or more corresponding queries. The web browser may render, based at least on the visualization data retrieved from the cloud-based analytics engine, the software widgets included in the data story including the corresponding data presentations.

The web browser may be configured to render, in response to the user at the client scrolling a viewport of the graphic user interface displayed at the client, the software widgets that are visible inside the viewport. Moreover, the web browser may render at least some of the software widgets sequentially such that the rendering of a first software widget may not begin until the rendering of a second software widget is complete. In some example embodiments, to prevent a performance bottleneck, the retrieval of visualization data from the cloud-based analytics engine may be performed at least partially in parallel with the rendering of the corresponding software widgets. For instance, visualization data associated with the first software widget may be retrieved while the web browser associated with the application is rendering the second software widget. As such, at least a portion of the visualization data retrieved from the cloud-based analytics engine may be cached prior to being used to render the corresponding software widgets. For example, raw visualization data from the cloud-based analytics engine may be held in a first cache before being processed and held in a second cache. Processed visualization data associated with the first software widget may remain in the second cache until the web browser associated with the application completes rendering the second software widget. Once the rendering of the second software widget is complete, the web browser may render the first software widget based on the processed visualization data from the second cache instead of triggering another query to retrieve, from the cloud-based analytics engine, the visualization data associated with the first software widget.

Figure 1:
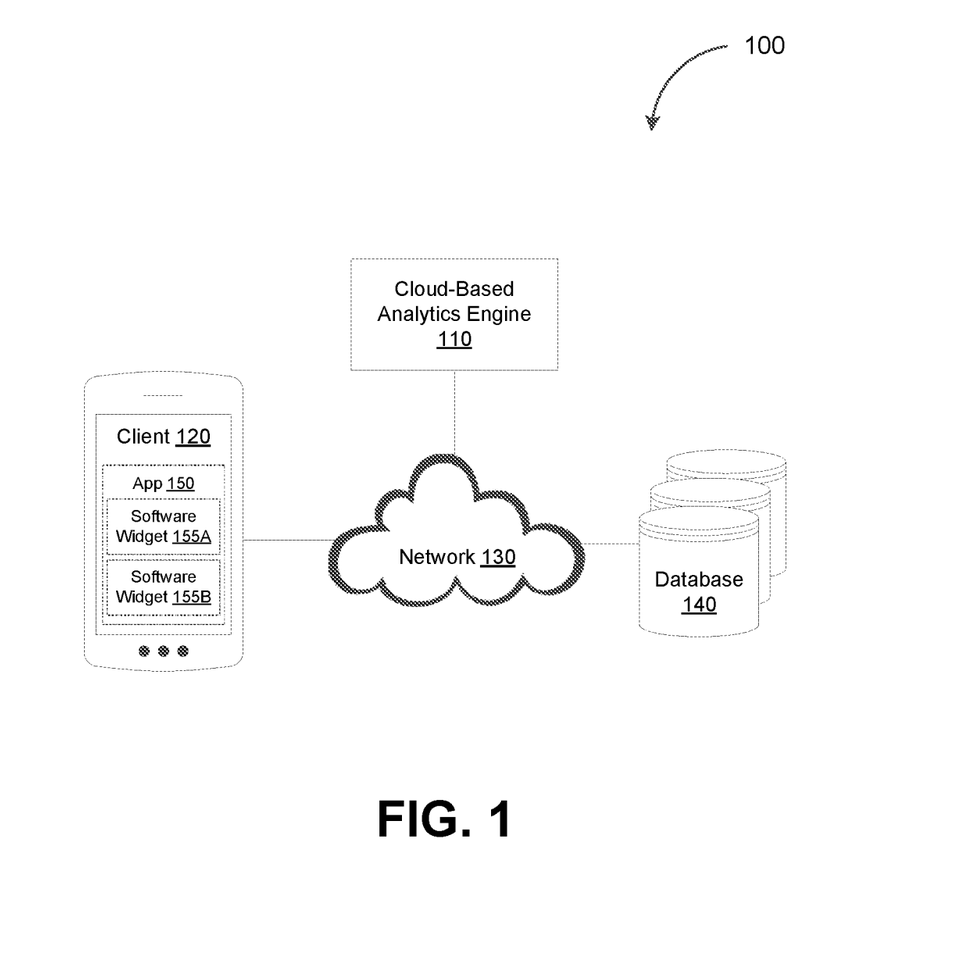
FIG. 1 depicts a system diagram illustrating a cloud-based analytics system, in accordance with some example embodiments.

FIG. 1 depicts a system diagram illustrating a cloud-based analytics system 100, in accordance with some example embodiments. Referring to FIG. 1, the cloud-based analytics system 100 may include a cloud-based analytics engine 110, a client 120, and a database 140. As shown in FIG. 1, the cloud-based analytics engine 110, the client 120, and the database 140 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like. Meanwhile, the database 140 may be any type of database including, for example, a graph database, an in-memory database, a relational database, a non-relational (NoSQL) database, and/or the like.

In some example embodiments, the client 120 may be a mobile device including, for example, a smartphone, a tablet computer, a wearable apparatus, and/or the like. However, it should be appreciated that the client 120 may be any processor-based device including, for example, a laptop computer, a workstation, and/or the like. As FIG. 1 shows, the client 120 may include an application 150. For example, the application 150 may be a mobile application, which may be a type of application software configured to run on a mobile device. Moreover, the application 150 may be a web application configured to provide access, at the client 120, to the cloud-based analytics engine 110.

The client 120 may interact with the cloud-based analytics engine 110 in order to access data stored in the database 140. For example, a user at the client 120 may send, via the application 150 at the client 120, a request to load a data story associated with at least a portion of the data stored at the database 140. As used herein, a "data story" may refer to a collection of software widgets and the corresponding data presentations that are created using the software widgets to provide a visual representation of at least the portion of the data stored at the database 140. The data story may include at least one page that is populated by one or more data presentations, each of which providing a visual representation of at least a subset of the portion of data associated with the data story. Meanwhile, a software widget may refer to any transient and/or auxiliary application such as, for example, a desk accessory (DA), an applet, and/or the like. Accordingly, the one or more software widgets included in a data story may be configured to run concurrently within a mobile desktop environment of the client 120 along with and/or as part of one or more other applications including, for example, the application 150.

Referring again to FIG. 1, the data story may include one or more software widgets including, for example, a first software widget 155A and a second software widget 155B. In response to the user at the client 120 requesting to load the data story, the application 150 may be configured to load and render, as part of a graphic user interface (GUI) displayed at the client 120, the first software widget 155A and the second software widget 155B. The user at the client 120 may interact with the first software widget 155A and/or the second software widget 155B in order to create, based on at least the portion of the data stored in the database 140, data presentations including, for example, tables, charts, graphs, diagrams, and/or the like. As used herein, the "rendering" of the first software widget 155A and/or the second software widget 155B may refer to the generation and/or synthesis of an image containing the first software widget 155A and/or the second software widget 155B, which may be displayed at the client 120 as part of a graphic user interface. For instance, the rendering of the first software widget 155A and/or the second software widget 155B may include translating structured data such that the first software widget 155A and/or the second software widget 155B may be displayed at the client 120.

For example, the user at the client 120 may request to load a data story associated with sales data stored in the database 140. Each page in this data story may correspond to sales data for an individual year while each data presentation in the data story may provide a visual representation of at least a portion of the sales data for a single year. For instance, one page in the data story may correspond to sales data for the year 2017 and the data presentations that are part of that page may include visual representations (e.g., charts, graphs, tables, diagrams, and/or the like) of the sales data for the year 2017. Alternatively and/or additionally, another page in the data story may correspond to sales data for the year 2018 and the data presentations populating that page may include visual representations (e.g., charts, graphs, tables, diagrams, and/or the like) of the sales data for the year 2018.

In response to the user at the client 120 requesting to load a data story, the application 150 may retrieve, from the cloud-based analytics engine 110, visualization data. For example, the application 150 may generate, based at least on a definition of the data story, one or more corresponding queries for retrieving, from the cloud-based analytics engine 110, visualization data that may be used to render the first software widget 155A and/or the second software widget 155B. It should be appreciated that the visualization data retrieved from the cloud-based analytics engine may be web content encoded in JavaScript Object Notation (JSON), Hypertext Markup Language (HTML), and/or Extensible Markup Language (XML). Alternatively and/or additionally, the definition of the data story may represent the data story using JavaScript Object Notation (JSON), Hypertext Markup Language (HTML), Extensible Markup Language (XML), and/or the like. The definition of the data story may capture a state of the data story including, for example, the software widgets (e.g., the first software widget 155A, the second software widget 155B, and/or the like) used to create the data presentations included in the data story as well as any filters that are applied to remove one or more portion of the underlying data.

A web browser associated with the application 150 may render, based at least on the visualization data retrieved from the cloud-based analytics engine 110, the first software widget 155A and/or the second software widget 155B including the corresponding data presentations. This web browser may be an "in-app web browser," which may refer to a web browser that is invoked through a corresponding application instead of being a standalone web browser. As such, the web browser associated with the application 150 may be used to embed web content such as, for example, the visualization data retrieved from the cloud-based analytics engine 110, directly within the application 150, without requiring the use of a separate and/or standalone web browser.

The web browser may be configured to render, in response to the user at the client 120 scrolling a viewport of the graphic user interface displayed at the client 120, the software widgets that are visible inside the viewport. Moreover, the web browser may render at least some of the software widgets sequentially such that the rendering of the first software widget 155A may not begin until the rendering of the second software widget 155B is complete. As such, in order to prevent a performance bottleneck, the retrieval of visualization data from the cloud-based analytics engine 110 may be performed at least partially in parallel with the rendering of the first software widget 155A and/or the second software widget 155B. For example, visualization data associated with the first software widget 155A may be retrieved from the cloud-based analytics engine 110 while the second software widget 155B is being rendered for display at the client 120.

In some example embodiments, at least a portion of the visualization data retrieved from the cloud-based analytics engine 110 may be cached prior to being used to render the corresponding software widgets. For example, raw visualization data from the cloud-based analytics engine may be held in a first cache before being processed and held in a second cache. Processed visualization data associated with the first software widget 155A may remain in the second cache until the web browser associated with the application 150 completes rendering the second software widget 155B. Furthermore, once the web browser completes rendering the second software widget 155B, the web browser may render the first software widget 155A based on the processed visualization data from the second cache instead of triggering another query to retrieve, from the cloud-based analytics engine 110, the visualization data associated with the first software widget 155A.

Figure 2:
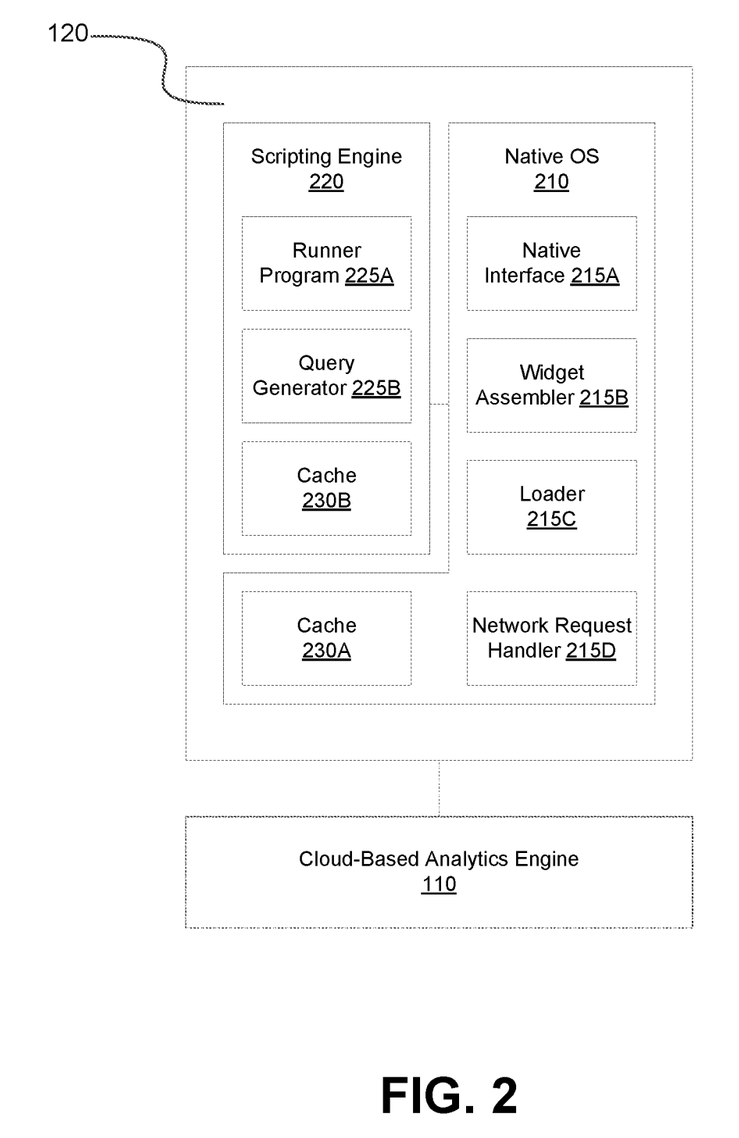
FIG. 2 depicts a block diagram illustrating a client, in accordance with some example embodiments.

To further illustrate, FIG. 2 depicts a block diagram illustrating the client 120, in accordance with some example embodiments. As noted, the client 120 may be a mobile device including, for example, a smartphone, a tablet computer, a wearable apparatus, and/or the like. The client 120 may be any processor-based device including, for example, a laptop computer, a workstation, and/or the like. Referring to FIGS. 1-2, the client 120 may include a native operating system 210 and a scripting engine 220. As shown in FIG. 2, the native operating system 210 may include one or more native components of the client 120 including, for example, a native interface 215A, a widget assembler 215B, a loader 215C, a network request handler 215D, and a first cache 230A. Meanwhile, the scripting engine 220 may include a runner program 225A, a query generator 225B, and a second cache 230B. It should be appreciated that the native operating system 210 may include native components that are implemented in a native programming language (e.g., Object C and/or C) of the client 120 whereas the scripting engine 220 may be part of a runtime environment for executing software programs implemented in a programming language (e.g., JavaScript) that is not native to the client 120.

In some example embodiments, the scripting engine 220 may, in response to the user at the client 120 loading the data story that includes the first software widget 155A and the second software widget 155B, execute the runner program 225A. The runner program 225A may include programming code configured to retrieve, from the cloud-based analytics engine 110, visualization data associated with the first software widget 155A and the second software widget 155B. The programming code for retrieving visualization data may be a script that is implemented in a scripting language (e.g., JavaScript and/or the like) such that the scripting engine 220 may execute the runner program 225A without compilation. Moreover, the execution of the runner program 225A may trigger the generation of one or more queries by the query generator 225B. The one or more queries may be configured to retrieve, from the cloud-based analytics engine 110, the visualization data associated with the first software widget 155A and/or the second software widget 155B. As such, the one or more queries may be routed, via the native interface 215A of the native operating system 210, to the network request handler 215D of the native operating system 210.

The network request handler 215D may send, via the network 130, the one or more queries to the cloud-based analytics engine. The raw visualization data that is received from the cloud-based analytics engine 110 in response to the one or more queries may be held in the first cache 230A of the native operating system 210. The scripting engine 220 may process the raw visualization data held in the first cache 230A before storing the processed visualization data in second cache 230B, where the processed visualization data may be held until the processed visualization data to render the corresponding first software widget 155A and/or the second software widget 155B. For example, the widget assembler 215B may be configured to assemble the visualization data required to render the software widgets included in the data story including, for example, the first software widget 155A and the second software widget 155B. Accordingly, the widget assembler 215B may be configured to trigger the loading of the first software widget 155A and/or the second software widget 155B by the loader 215C. The loader 215C may be, for example, programming code (e.g., JavaScript code and/or the like) that is run by the web browser associated with the application 150. Meanwhile, the loader 215C may request, from the runner program 225A, the processed visualization data required to render, as part of the graphic user interface (GUI) displayed at the client 120, the first software widget 155A and/or the second software widget 155B. Instead of generating and sending, to the cloud-based analytics engine 110, another query to retrieve the visualization data, the runner program 225A may responds to the request from the loader 215C by at least returning, to the loader 215C, the processed visualization data stored in the second cache 230B.

The viewport of the graphic user interface displayed at the client 120 may accommodate some but not all of the software widgets included in the data story. As such, the loader 215C may be configured to render at least some of the software widgets included in the data story sequentially. For example, the loader 215C may render the second software widget 155B while the second software widget 155B is visible inside the viewport of the graphic user interface before rendering the first software widget 155A in response to the user at the client 120 scrolling the viewport of the graphic user interface to reveal the first software widget 155A. Moreover, the loader 215C may not begin rendering the first software widget 155A until the rendering of the second software widget 155B is complete.

In some example embodiments, the rendering of the second software widget 155B by the loader 215C may be performed at least partially in parallel with the scripting engine 220 executing the runner program 225A to retrieve, from the cloud-based analytics engine 110, the visualization data associated with the first software widget 155A. The raw visualization data retrieved from the cloud-based analytics engine 110 may be held in the first cache 230A of the native operating system 210 before being processed by the scripting engine 220 and held in the second cache 230B until the loader 215C completes the rendering of the second software widget 155B. Once the loader 215C completes the rendering of the second software widget 155B, the loader 215C may begin rendering, based at least on the processed visualization data held in the second cache 230B, the first software widget 155A. As noted, the rendering of the first software widget 155A may include rendering a corresponding data presentation (e.g., table, chart, diagram, graph, and/or the like) that provides a visual representation of at least a portion of the data stored at the database 140 and associated with the data story being loaded by the user at the client 120.

Figure 3A:
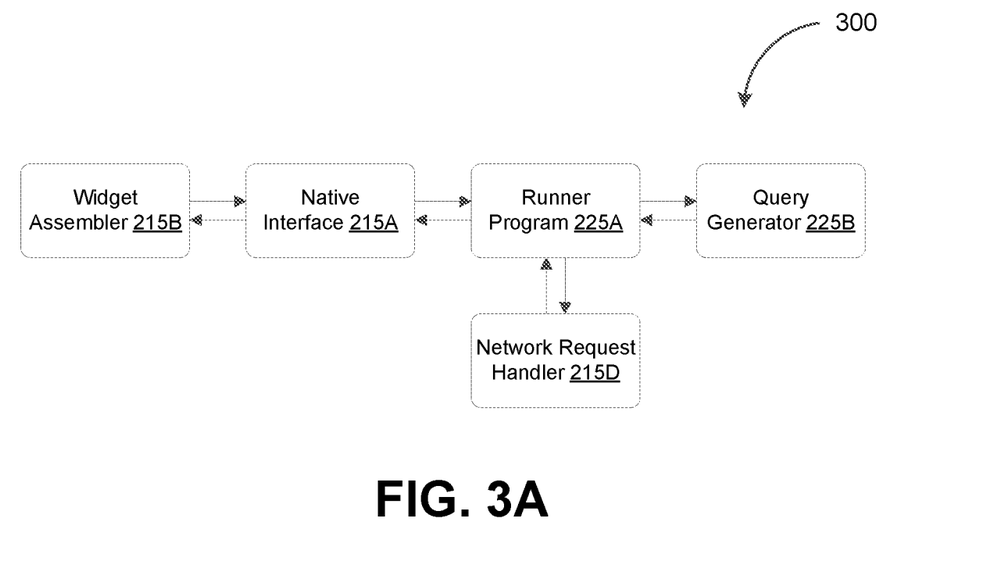
FIG. 3A depicts a workflow diagram illustrating a process for retrieving visualization data from a cloud-based analytics engine, in accordance with some example embodiments.

FIG. 3A depicts a workflow diagram illustrating a process 300 for retrieving visualization data from the cloud-based analytics engine 110, in accordance with some example embodiments. Referring to FIGS. 1-2 and 3A, the retrieval of visualization data from the cloud-based analytics engine 110 may be triggered by the widget assembler 215B, which may be a native component of the native operating system 210 of the client 120, responding to the user at the client 120 loading the data story that includes the first software widget 155 and the second software widget 155B. In some example embodiments, the widget assembler 215B may respond to the user at the client 120 loading the data story by at least triggering the retrieval of visualization data associated with the first software widget 155A and the second software widget 155B.

The retrieval of visualization data for the first software widget 155A and the second software widget 155B may be performed at least partially in parallel with the rendering of the first software widget 155A and/or the second software widget 155B. Moreover, the retrieval of the visualization data for the first software widget 155A and the second software widget 155B may be triggered by the widget assembler 215B triggering, via the native interface 215A, the execution of the runner program 225A by the scripting engine 220. The runner program 225A may be configured to retrieve the visualization data for the first software widget 155A and/or the second software widget 155B by at least triggering the generation of one or more corresponding queries by the query generator 225B. The one or more queries may be routed, to the cloud-based analytics engine 110, by the network request handler 215D. As noted, the network request handler 215D may be another native component of the native operating system 210 of the client 120.

The cloud-based analytics engine 110 may respond to the one or more queries by at least sending, to the client 120, raw visualization data associated with the first software widget 155A and/or the second software widget 155B. The raw visualization data may be routed, via the network request handler 215D, to the runner program 225A before being returned, via the native interface 215A, to the widget assembler 215B. In some example embodiments, the raw visualization data for the first software widget 155A and/or the second software widget 155B may be held in the first cache 230A before being processed by the scripting engine 220. Processed visualization data for the first software widget 155A and/or the second software widget 155B may be held in the second cache 230B until the processed visualization data is used by the loader 215C to render the the first software widget 155A and/or the second software widget 155B.

Figure 3B:
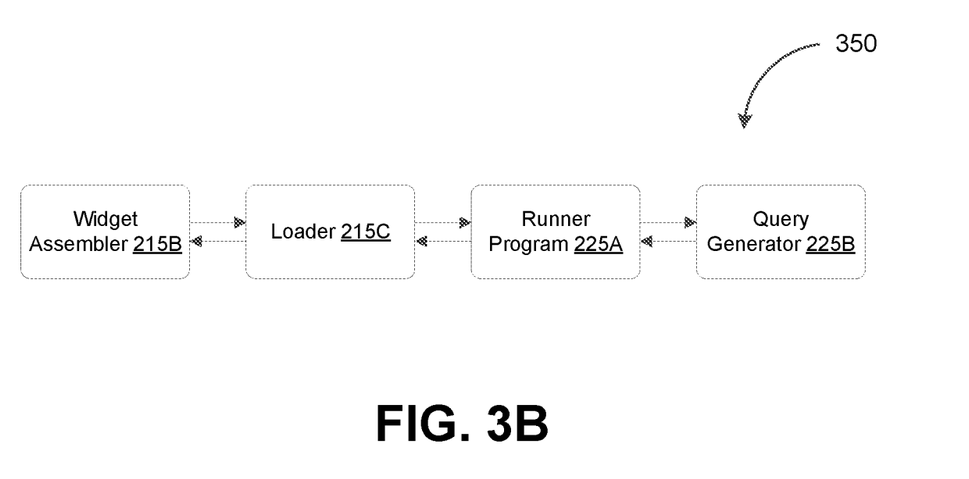
FIG. 3B depicts a workflow diagram illustrating a process for rendering a software widget, in accordance with some example embodiments.

FIG. 3B depicts a workflow diagram illustrating a process 350 for rendering a software widget, in accordance with some example embodiments. As noted, in some example embodiments, the retrieval of visualization data for the first software widget 155A and the second software widget 155B may be performed at least partially in parallel with the rendering of the first software widget 155A and/or the second software widget 155B. For example, the loader 215C may render the second software widget 155B while the scripting engine 220 is simultaneously executing the runner program 225A to retrieve the visualization data for the first software widget 155A. Thus, when the widget assembler 215B loads the first software widget 155A and the loader 215C begins to render of the first software widget 155A, for example, after the rendering of the second software widget 155B is complete, the visualization data for the first software widget 155A may already be processed by the scripting engine 220 and held in the second cache 230B.

Accordingly, while the loader 215C may send, to the runner program 225A, a request for the visualization data associated with the first software widget 155A, the runner program 225A may respond to the request by retrieving processed visualization data from the second cache 230B instead of triggering another query to retrieve, from the cloud-based analytics engine 110, the visualization data for the first software widget 155A. The runner program 225A may return, to the loader 215C, the processed visualization data for the first software widget 155A such that the loader 215C may render, based at least on the processed visualization data, the first software widget 155A. For example, the loader 215C may render, in the viewport of the graphic user interface (GUI) displayed at the client 120, the data presentation included in the first software widget 155A. This data presentation may be a table, a chart, a graph, a diagram, and/or the like that provides a visual representation of at least a portion of the data from the database 140 associated with the data story being loaded by the user at the client 120.

In some example embodiments, upon rendering the first software widget 155A at the client 120, the loader 215C may send, to the widget assembler 215B, an indication that the loading of the first software widget 155A is complete. Meanwhile, the widget assembler 215B may determine, based at least on the indication from the loader 215C, a status of the data story being loaded for display at the client 120. For instance, the widget assembler 215B may determine that the loading of the data story at the client 120 is complete if the widget assembler 215B receives, from the loader 215C, one or more indications that all of the software widgets (e.g., the first software widget 155A, the second software widget 155B, and/or the like) included in the data story have been loaded at the client 120.

Figure 4:
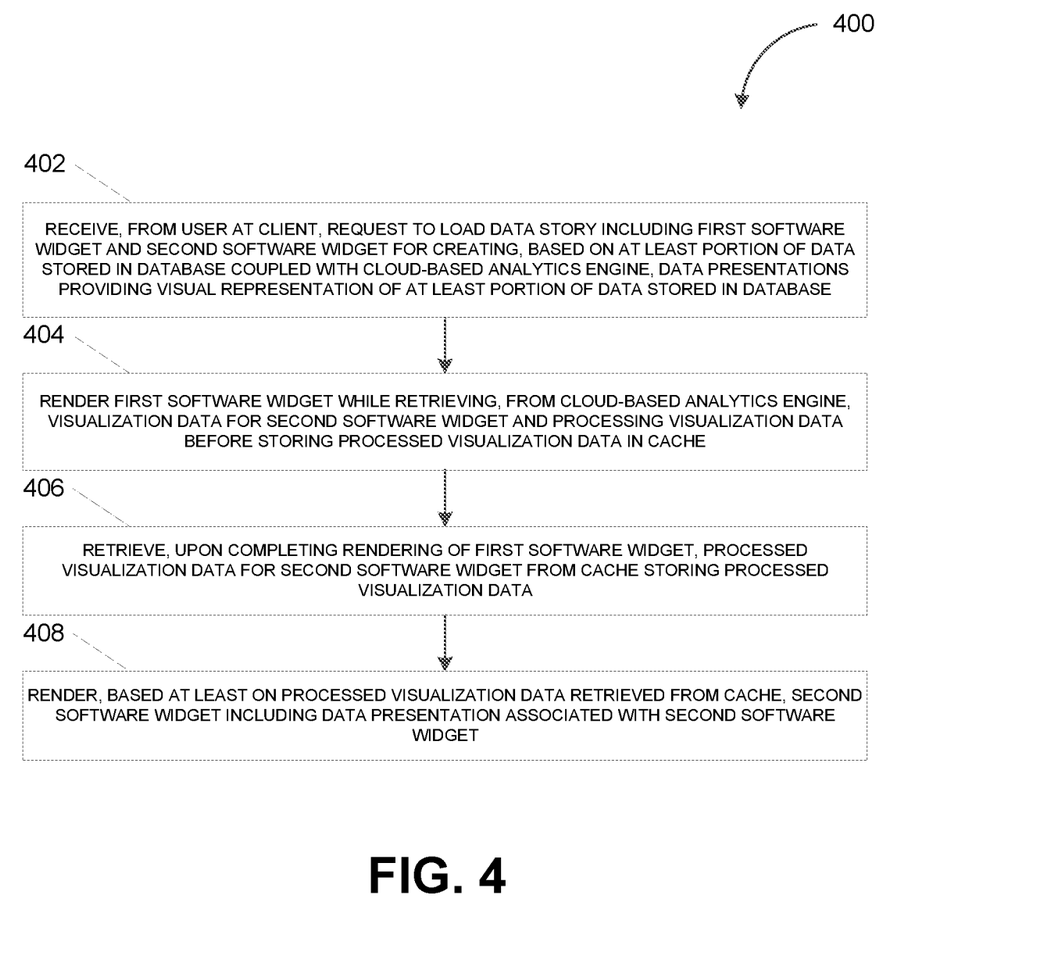
FIG. 4 depicts a flowchart illustrating a process for accessing data in a database, in accordance with some example embodiments.

FIG. 4 depicts a flowchart illustrating a process 400 for accessing data in the database 140, in accordance with some example embodiments. Referring to FIGS. 1, 2, 3A-B, and 4, the process 400 may be performed at the client 120, for example, to retrieve visualization data from the cloud-based analytics engine 110 and render, based at least on the visualization data, a corresponding software widget.

At 402, the application 150 may receive, from a user at the client 120, a request to load a data story including a first software widget and a second software widget for creating, based on at least a portion of data stored in the database 140 coupled with the cloud-based analytics engine 110, data presentations providing a visual representation of at least the portion of the data stored in the database. For example, the user at the client 120 may send, via the application 150, a request to load a data story that includes the first software widget 155A and the second software widget 155B. The data story being loaded by the user at the client 120 may be associated with sales data stored in the database 140. As such, the first software widget 155A and the second software widget 155B may enable the user at the client 120 to create data presentations (e.g., charts, graphs, tables, diagrams, and/or the like) corresponding to at least a subset of the sales data stored in the database 140. For instance, the first software widget 155A may be configured to enable the creation of a chart (or a different data presentation) that provides a visual representation of at least a portion of the sales data from the year 2017. Alternatively and/or additionally, the second software widget 155B may be configured to enable the creation of a graph (or a different data presentation) that provides a visual representation of at least a portion of the sales data from the year 2018.

At 404, the application 150 may render the first software widget while retrieving, from the cloud-based analytics engine 110, visualization data for the second software widget and processing the visualization data before storing the processed visualization data in a cache. In some example embodiments, while the scripting engine 220 executes the runner program 225A to retrieve, from the cloud-based analytics engine, visualization data for the first software widget 155A, the loader 215C in the native operating system 210 of the client 120 may render the second software widget 155B. The retrieval of visualization data for the first software widget 155A being performed at least partially in parallel with the rendering of the second software widget 155B may eliminate at least some performance bottlenecks that arise due to the loader 215C being configured to render the first software widget 155A only after the rendering of the second software widget 155B is complete. Raw visualization data for the first software widget 155A may be retrieved from the cloud-based analytics engine 110 and held in the first cache 230A of the native operating system 210. The scripting engine 220 may process the raw visualization data in the first cache 230A before storing, in the second cache 230B, the processed visualization data. Processed visualization data for the first software widget 155A may remain in the second cache 230B until the loader 215C begins rendering the first software widget 155A which, as noted, may not occur until the loader 215C has completed rendering the second software widget 155B.

At 406, the application 150 may retrieve, upon completing the rendering of the first software widget, processed visualization data for the second software widget from the cache storing processed visualization data. Furthermore, at 408, the application 150 may render, based at least on the processed visualization data retrieved from the cache, the second software widget including the data presentation associated with the second software widget. In some example embodiments, the loader 215C may be configured to render the first software widget 155A and/or the second software widget 155B while the second software widget 155B is visible in the viewport of the graphic user interface displayed at the client 120. However, the loader 215C may not begin rendering the first software widget 155A until the rendering of the second software widget 155B is complete.

Once the loader 215C completes rendering the second software widget 155B, the loader 215C may begin rendering, based at least on the processed visualization data stored in the second cache 230B, the first software widget 155A. For example, in order to load the first software widget 155A, the loader 215C may send, to the runner program 225A, a request for the corresponding visualization data. Instead of triggering one or more queries to retrieve raw visualization data for the first software widget 155A from the cloud-based analytics engine 110 a second time, the runner program 225A may respond to the request by at least returning, to the loader 215C, the processed visualization data for the first software widget 155A already present in the second cache 230B. The loader 215C may render, based at least on the processed visualization data from the second cache 230B, the first software widget 155A. For example, the loader 21%C may include the data presentation associated with the first software widget 155A, which may be a table, a diagram, a chart, a graph, and/or the like that provides a visual representation of at least the portion of the data stored in the database 140 associated with the data story being loaded by the user at the client 120

Table 1 below includes an example of raw visualization data retrieved, for example, from the cloud-based analytics engine 110. As noted, raw visualization data for rendering one software widget may be retrieved from the cloud-based analytics engine 110 and held in the first cache 230A of the native operating system 210. The raw visualization data may subsequently be processed by the scripting engine 220 and held in the second cache 230B until the loader 215C completes the rendering of a preceding software widget.

TABLE 1

```
{
    "DataSource" : {
        "Type" : "Planning",
        "SchemaName" : "TENANT_TEST",
        "PackageName" : "",
        "ObjectName" : "/sap.epm/BestRunJuice_SampleModel_qs",
        "InstanceId" : "a9905183-1dd3-b954-1083-b34a28100cf3",
        "Alias" : ""
    },
    "Grids" : [{
        "Name" : "",
        "Description" : "",
        "Id" : "",
        "QueryId" : "",
        "InputEnabled" : true,
        "Interval" : false,
        "ResultFormat" : "Version2",
        "ResultEncoding" : "None",
        "SubSetDescription" : {
            "RowFrom" : 0,
```

TABLE 1-continued

```
                "RowTo" : 1,
                "ColumnFrom" : 0,
                "ColumnTo" : 1
            },
            "Axes" : [{
                    "Name" : "ROWS",
                    "Type" : "Rows",
                    "Dimensions" : [ ],
                    "TupleCountTotal" : 0,
                    "TupleCount" : 0,
                    "Tuples" : [ ],
                    "TupleSemantic" : {
                        "Encoding" : "None",
                        "Values" : [ ]
                    },
                    "ExceptionAlertLevel" : [ ],
                    "ExceptionName" : [ ]
                }, {
                    "Name" : "COLUMNS",
                    "Type" : "Columns",
                    "Dimensions" : [{
                            "Name" : "CustomDimension1",
                            "Description" : "Measures",
                            "MemberTypes" : {
                                "Encoding" : "None",
                                "Values" : [0]
                            },
                            "Attributes" : [{
                                    "Name" : "[Measures].[Measures]",
                                    "Description" : "Measures",
                                    "IsKey": false,
                                    "DataType" : 3,
                                    "ValueType" : "String",
                                    "Obtainability" : "Always",
                                    "Values" : ["SignedData"],
                                    "ValuesException" : [0]
                                }, {
                                    "Name" : "[Measures].[Description]",
                                    "Description" : "Description",
                                    "IsKey" : false,
                                    "DataType" : 3,
                                    "ValueType" : "String",
                                    "Obtainability" : "Always",
                                    "Values" : ["SignedData"],
                                    "ValuesException" : [0]
                                }
                            ]
                        },{
                            "Name" : "Account_BestRunJ_sold",
                            "Description" : "",
                            "MemberTypes" : {
                                "Encoding" : "None",
                                "Values" : [0]
                            },
                            "Attributes" : [{
                                    "Name" : "[Account_BestRunJ_sold].key",
                                    "Description" : "Account",
                                    "IsKey" : false,
                                    "DataType" : 3,
                                    "ValueType" : "String",
                                    "Obtainability" : "Always",
                                    "Values" : ["[Account_BestRunJ_sold].[parentId].&[Discount]"],
                                    "ValuesException" : [0]
                                }, {
                                    "Name" : "[Account_BestRunJ_sold].name",
                                    "Description" :
```

TABLE 1-continued

```
"Account",
                                            "IsKey" : false,
                                            "DataType" : 3,
                                            "ValueType" : "String",
                                            "Obtainability" :
"Always",
                                            "Values" :
["Discount"],
                                            "ValuesException" : [0]
                                    }, {
                                            "Name" :
"[Account_BestRunJ_sold].description",
                                            "Description" :
"Account",
                                            "IsKey" : false,
                                            "DataType" : 3,
                                            "ValueType" : "String",
                                            "Obtainability" :
"Userinterface",
                                            "Values" :
["Discount"],
                                            "ValuesException" : [0]
                                    }, {
                                            "Name" :
"[Account_BestRunJ_sold].path",
                                            "Description" :
"Account",
                                            "IsKey" : false,
                                            "DataType" : 3,
                                            "ValueType" : "String",
                                            "Obtainability" :
"UserInterface",
                                            "Values" :
["{\"Name\":[\"Discount\"],\"Description\":[\"Discount\"],\"UniqueName\":[\"[Account_BestRunJ_sold].[parentId].&[Discount]\"]}"],
                                            "ValuesException" : [0]
                                    }
                                ]
                            }
                        ],
                        "TupleCountTotal" : 1,
                        "TupleCount" : 1,
                        "Tuples" : [{
                                "TupleElementIds" : {
                                    "Encoding" : "None",
                                    "Values" : ["SignedData"]
                                },
                                "MemberIndexes" : {
                                    "Encoding" : "None",
                                    "Values" : [0]
                                },
                                "ParentIndexes" : {
                                    "Encoding" : "None",
                                    "Values" : [-1]
                                },
                                "DisplayLevel" : {
                                    "Encoding" : "None",
                                    "Values" : [0]
                                },
                                "DrillState" : {
                                    "Encoding" : "None",
                                    "Values" : [0]
                                }
                        }, {
                                "TupleElementIds" : {
                                    "Encoding" : "None",
                                    "Values" :
["[Account_BestRunJ_sold].[parentId].&[Discount]"]
                                },
                                "MemberIndexes" : {
                                    "Encoding" : "None",
                                    "Values" : [0]
                                },
                                "ParentIndexes" : {
                                    "Encoding" : "None",
                                    "Values" : [-1]
                                },
                                "DisplayLevel" : {
                                    "Encoding" : "None",
                                    "Values" : [0]
```

TABLE 1-continued

```
                },
                "DrillState" : {
                    "Encoding" : "None",
                    "Values" : [1]
                }
            }
        ],
        "TupleSemantic" : {
            "Encoding" : "None",
            "Values" : [0]
        },
        "ExceptionAlertLevel" : [ ],
        "ExceptionName" : [ ]
    }
],
"Exceptionsettings" : [ ],
"InputReadinessStates" : [[{
            "Flag" : "PublicVersion"
        }
    ], [{
            "Flag" : "Unbooked"
        }
    ]],
"Cells" : {
    "Values" : {
        "Encoding" : "None",
        "Values" : [303131265.68]
    },
    "ValuesRounded" : {
        "Encoding" : "None",
        "Values" : ["303131265.68"]
    },
    "ValuesFormatted" : {
        "Encoding" : "None",
        "Values" : ["303.13 Million"]
    },
    "InputReadinessIndex" : {
        "Encoding" : "None",
        "Values" : [0]
    },
    "Exceptions" : {
        "Encoding" : "None",
        "Values" : [0]
    },
    "UnitTypes" : {
        "Encoding" : "None",
        "Values" : [1]
    },
    "Units" : {
        "Encoding" : "None",
        "Values" : ["USD"]
    },
    "UnitDescriptions" : {
        "Encoding" : "None",
        "Values" : ["$"]
    },
    "Actions" : {
        "Encoding" : "None",
        "Values" : [""]
    },
    "CellFormat" : {
        "Encoding" : "None",
        "Values" : ["#,##0.00\"Million\""]
    },
    "NumericShift" : {
        "Encoding" : "None",
        "Values" : [-6]
    },
    "NumericRounding" : {
        "Encoding" : "None",
        "Values" : [2]
    },
    "CellDataType" : {
        "Encoding" : "None".
        "Values" : ["DecimalFloat"]
    },
    "ExceptionSettingIndex" : {
        "Encoding" : "None",
        "Values" : [-1]
    },
```

TABLE 1-continued

```
                "CellValueTypes" : {
                    "Encoding" : "None",
                    "Values" : [10]
                }
            },
            "CellArraySizes" : [1, 1],
            "ResultSetState" : 0,
            "HasErrors" : false,
            "Messages" : [ ]
        }
    ],
}
Data after processing:
{
 "dimAxes": { },
 "metadata": {
  "dictionary": {
   "measureGroup1": [
    {
     "parentKey": {
      "id": "parentId",
      "type": "hierarchy.pch",
      "parentKey": {
       "id": "plaiming:[TENANT_TEST][ ][/sap.epm/BestRunJuice_SampleModel_qs]",
       "type": "dataset"
      },
      "dimension": "Account_BestRunJ_sold"
     },
     "type": "member",
     "id":"[Account_BestRunJ_sold].[parentId].&[Discount]"
    }
   ]
  }
 },
 "valueAxes": [
  {
   "measureGroup1": [
    303131265.68
   ],
   "measureGroup1_warnings": [ ],
   "measureGroup1_formatted_values": [
    "303.13 Million"
   ],
   "measureGroup1_format_strings": [
    "#,##0.00\" Million\""
   ],
   "measureGroup1_currency_units": [
    "$"
   ],
   "measureGroup1_currency_unit_labels": [
    "USD"
   ],
   "measureGroup1_currency_unit_magnitudes": [
    "Million"
   ],
   "measureGroup1_thresholds": [
    null
   ],
   "measureGroup1_exception_settings": [ ],
   "measureGroup1_node_info": [
    {
     "key": "[Account_BestRunJ_sold].[parentId].&[Discount]",
     "value": "Discount",
     "parent": [ ],
     "nodetype": [
      "Root",
      "Leaf"
     ],
     "nodedepth": [
      0
     ],
     "nodepath": [
      [
       {
        "name": "[Account_BestRunJ_sold].[parentId].&[Discount]",
        "description": "Discount",
        "displayKey": "Discount"
       }
      ]
     ]
```

TABLE 1-continued

```
        }
      ]
    }
  ],
  "ranges": { },
  "executionStatus": {
    "status": "ok"
  },
  "incompleteResult": false,
  "supportAlphabeticSorting": true,
  "supportRanking": true
}
```

Figure 5:
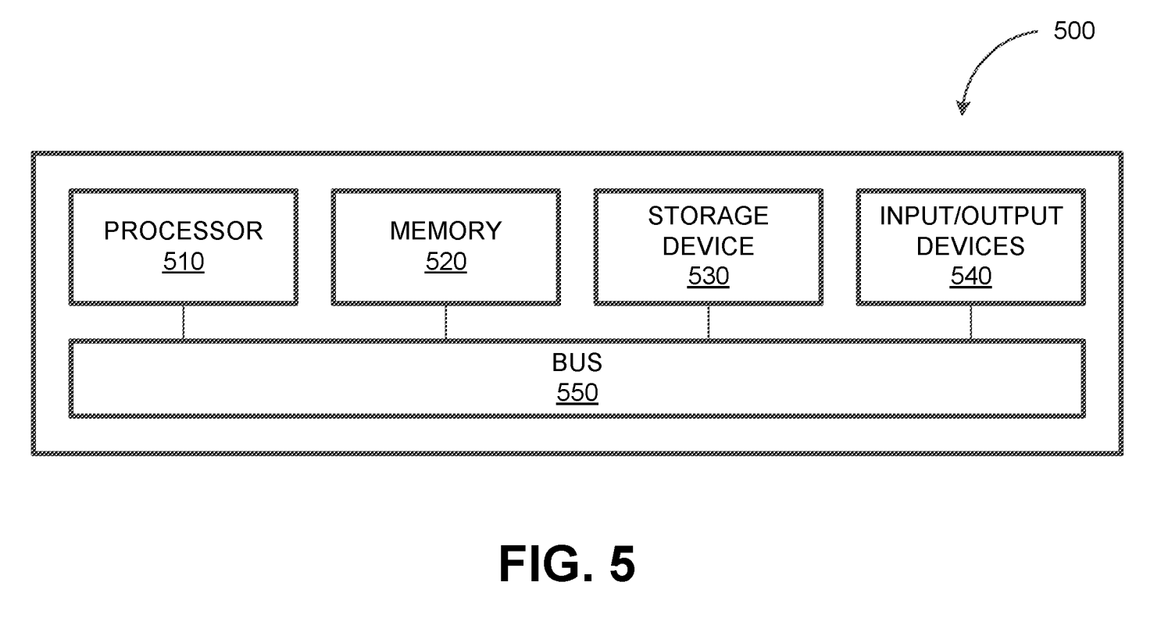
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the cloud-based analytics engine 110, the client 120, and/or any components therein.

As shown in FIG. 5, the computing system 500 can include a processor 510, a memory 520, a storage device 530, and indication/output devices 540. The processor 510, the memory 520, the storage device 530, and the indication/output devices 540 can be interconnected via a system bus 550. The processor 510 is capable of processing instructions for execution within the computing system 500. Such executed instructions can implement one or more components of, for example, the cloud-based analytics engine 110 and/or the client 120. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the indication/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid state device, and/or other suitable persistent storage means. The indication/output device 540 provides indication/output operations for the computing system 500. In some example embodiments, the indication/output device 540 includes a keyboard and/or pointing device. In various implementations, the indication/output device 540 includes a display unit for displaying graphical user interfaces.

According to some example embodiments, the indication/output device 540 can provide indication/output operations for a network device. For example, the indication/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the indication/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one indication device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide indication to the computer. Other kinds of devices can be used to provide for interaction with a user as well. For example, feedback provided to the user can be any form of sensory feedback, such as for example visual feedback, auditory feedback, or tactile feedback; and indication from the user may be received in any form, including acoustic, speech, or tactile indication. Other possible indication devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, at an application, a request to load a data story, the data story including a first software widget and a second software widget, the first software widget and the second software widget each being configured to create, based at least on a portion of data stored in a database coupled with a cloud-based analytics engine, a corresponding data presentation providing a visual representation of at least the portion of data;
   while the first software widget is being rendered,
   retrieving, from the cloud-based analytics engine, a visualization data for the second software widget,
   processing the visualization data for the second software widget, and
   storing, in a cache, the processed visualization data for the second software widget; and
   upon completing the rendering of the first software widget, rendering, based at least on the processed visualization data for the second software widget stored in the cache, the second software widget.

2. The system of claim 1, wherein the first software widget and/or the second software widget are rendered in a viewport of a graphic user interface displayed at a client.

3. The system of claim 1, wherein the visualization data retrieved from the cloud-based analytics engine comprises raw visualization data, and wherein the raw visualization data is stored in another cache prior to the processing.

4. The system of claim 1, further comprising:
   sending, to the cloud-based analytics engine, a query configured to retrieve, from the cloud-based analytics engine, the visualization data for the second software widget.

5. The system of claim 4, wherein the rendering of the second software widget includes retrieving the processed visualization data for the second software widget from the cache without sending, to the cloud-based analytics engine, another query to retrieve the visualization data for the second software widget.

6. The system of claim 1, wherein the rendering of the first software widget and/or the second software widget are performed by a web browser associated with the application, and wherein the web browser is implemented in a native programming language of a mobile device hosting the application.

7. The system of claim 6, wherein the retrieval of the visualization data is performed by a scripting engine executing programming code, wherein the scripting engine is associated with a programing language that is non-native to the mobile device hosting the application, and wherein the programming code comprises a script that is executed by the scripting engine without compilation.

8. The system of claim 6, wherein the cloud-based analytics engine is configured to provide, to the mobile device, access to the data stored in the database by at least providing, to the mobile device, the visualization data for rendering the data presentation.

9. The system of claim 1, wherein the rendering of the first software widget and the second software widget are performed sequentially, and wherein the retrieval of the visualization data for the second software widget is performed at least partially in parallel with the rendering of the first software widget.

10. The system of claim 1, wherein the first software widget and/or the second software widget comprise transient applications and/or auxiliary applications.

11. A computer-implemented method, comprising:
receiving, at an application, a request to load a data story, the data story including a first software widget and a second software widget, the first software widget and the second software widget each being configured to create, based at least on a portion of data stored in a database coupled with a cloud-based analytics engine, a corresponding data presentation providing a visual representation of at least the portion of data;
while the first software widget is being rendered,
retrieving, from the cloud-based analytics engine, a visualization data for the second software widget,
processing the visualization data for the second software widget, and
storing, in a cache, the processed visualization data for the second software widget; and
upon completing the rendering of the first software widget, rendering, based at least on the processed visualization data for the second software widget stored in the cache, the second software widget.

12. The method of claim 11, wherein the first software widget and/or the second software widget are rendered in a viewport of a graphic user interface displayed at a client.

13. The method of claim 11, wherein the visualization data retrieved from the cloud-based analytics engine comprises raw visualization data, and wherein the raw visualization data is stored in another cache prior to the processing.

14. The method of claim 11, further comprising:
sending, to the cloud-based analytics engine, a query configured to retrieve, from the cloud-based analytics engine, the visualization data for the second software widget.

15. The method of claim 14, wherein the rendering of the second software widget includes retrieving the processed visualization data for the second software widget from the cache without sending, to the cloud-based analytics engine, another query to retrieve the visualization data for the second software widget.

16. The method of claim 11, wherein the rendering of the first software widget and/or the second software widget are performed by a web browser associated with the application, and wherein the web browser is implemented in a native programming language of a mobile device hosting the application.

17. The method of claim 16, wherein the retrieval of the visualization data is performed by a scripting engine executing programming code, wherein the scripting engine is associated with a programing language that is non-native to the mobile device hosting the application, and wherein the programming code comprises a script that is executed by the scripting engine without compilation.

18. The method of claim 16, wherein the cloud-based analytics engine is configured to provide, to the mobile device, access to the data stored in the database by at least providing, to the mobile device, the visualization data for rendering the data presentation.

19. The method of claim 11, wherein the rendering of the first software widget and the second software widget are performed sequentially, and wherein the retrieval of the visualization data for the second software widget is performed at least partially in parallel with the rendering of the first software widget.

20. A non-transitory computer-readable medium storing instructions, which when executed by at least one data processor, result in operations comprising:
receiving, at an application, a request to load a data story, the data story including a first software widget and a second software widget, the first software widget and the second software widget each being configured to create, based at least on a portion of data stored in a database coupled with a cloud-based analytics engine, a corresponding data presentation providing a visual representation of at least the portion of data;
while the first software widget is being rendered,
retrieving, from the cloud-based analytics engine, a visualization data for the second software widget,
processing the visualization data for the second software widget, and
storing, in a cache, the processed visualization data for the second software widget; and
upon completing the rendering of the first software widget, rendering, based at least on the processed visualization data for the second software widget stored in the cache, the second software widget.

* * * * *